US011429597B2

(12) United States Patent
Muthiah et al.

(10) Patent No.: US 11,429,597 B2
(45) Date of Patent: Aug. 30, 2022

(54) SYSTEM AND METHOD FOR RECONSTRUCTING REGRESSION TEST SCENARIOS USING POST-PRODUCTION EVENTS

(71) Applicant: Cognizant Technology Solutions India Pvt. Ltd., Chennai (IN)

(72) Inventors: Subbiah Muthiah, Chennai (IN); Kumaran Surendran, Chennai (IN); Khaja Nizamuddin Kurumulakota, Proddatur (IN); Vignesh Nagarajan, Chennai (IN)

(73) Assignee: COGNIZANT TECHNOLOGY SOLUTIONS INDIA PVT. LTD., Chennai (IN)

( * ) Notice: Subject to any disclaimer, the term of this patent is extended or adjusted under 35 U.S.C. 154(b) by 225 days.

(21) Appl. No.: 16/856,209

(22) Filed: Apr. 23, 2020

(65) Prior Publication Data
US 2021/0232570 A1    Jul. 29, 2021

(30) Foreign Application Priority Data

Jan. 23, 2020 (IN) .............................. 202041003079

(51) Int. Cl.
 G06F 16/23        (2019.01)
 G06F 16/2455      (2019.01)
 G06F 11/36        (2006.01)
(52) U.S. Cl.
 CPC ...... *G06F 16/2379* (2019.01); *G06F 11/3684* (2013.01); *G06F 16/24558* (2019.01)
(58) Field of Classification Search
 None
 See application file for complete search history.

(56) References Cited

U.S. PATENT DOCUMENTS 10,204,349 B2 *  2/2019  McCauley ............. G06Q 30/02
10,423,688 B1 *  9/2019  Patton ................. G06F 16/9535
(Continued)

FOREIGN PATENT DOCUMENTS

CN   101329652 B   12/2010
CN   108255699 A    7/2018
CN   109062799 A   12/2018

OTHER PUBLICATIONS

Automating User Journey—An Important Activity While Developing a System, (https://www.360logica.com/blog/automating-user-journey-an-important-activity-while-developing-a-system/), Mar. 4, 2019.

*Primary Examiner* — Wilson Lee
(74) *Attorney, Agent, or Firm* — Cantor Colburn LLP

(57) ABSTRACT

The present invention provides for a system and a method for reconstructing regression test cases using post production events. The present invention provides for a test case reconstruction engine configured to extract post-production identifiable elements associated with a post-production event and pre-production identifiable elements associated with a pre-production event. The present invention provides for a system and a method for determining similarity between the pre-production event and the post-production event based on a comparison of one or more pre-production parent identifiable elements and one or more pre-production child identifiable elements of a subject identifiable element, with the post-production identifiable elements. The present invention provides for a system and a method for reconstructing a regression test case based on a comparison of functions of the extracted pre-production identifiable elements and the post-production identifiable elements after the determination of similarity between the pre-production event and the post-production event.

18 Claims, 3 Drawing Sheets

(56) References Cited

U.S. PATENT DOCUMENTS

| | | | |
|---|---|---|---|
| 2008/0133210 A1* | 6/2008 | Chagoly | G06F 9/45512 703/22 |
| 2010/0205168 A1* | 8/2010 | Yang | G06F 16/951 707/E17.108 |
| 2012/0177121 A1* | 7/2012 | Tripathi | H04N 19/154 375/E7.243 |
| 2014/0101640 A1* | 4/2014 | Romdhane | G06F 11/3688 717/125 |
| 2015/0057875 A1* | 2/2015 | McGinnis | G07C 5/0841 701/31.6 |
| 2015/0161529 A1* | 6/2015 | Kondaji | G06Q 10/063 705/7.11 |
| 2016/0218884 A1* | 7/2016 | Ebrom | H04L 12/2814 |
| 2018/0007175 A1 | 1/2018 | Tischart | |
| 2019/0163556 A1* | 5/2019 | Kataria | G06F 11/0757 |
| 2019/0370089 A1* | 12/2019 | Patton | G08B 21/182 |
| 2021/0045719 A1* | 2/2021 | Götte | A61B 8/145 |
| 2021/0357953 A1* | 11/2021 | Levi | G06Q 30/0275 |

* cited by examiner

SYSTEM AND METHOD FOR RECONSTRUCTING REGRESSION TEST SCENARIOS USING POST-PRODUCTION EVENTS

CROSS REFERENCE TO RELATED APPLICATION

This application is related to and claims the benefit of Indian Patent Application Number 202041003079 filed on Jan. 23, 2020, the contents of which are herein incorporated by reference in their entirety.

FIELD OF THE INVENTION

The present invention relates generally to testing of applications, and more particularly, the present invention relates to a system and method for reconstructing regression test case scenarios using post-production user events.

BACKGROUND OF THE INVENTION

During testing of an application, test cases are derived from requirements provided by users. The testing is done so as to ensure that features are implemented and there is no defect as an application moves to production environment. The test cases are tested manually or are automated. For every application release, a plurality of relevant test cases are derived that are known as regression test cases. The regression test cases are critical test cases of the application that are built over several application releases, and are then, tested in every release. Regression testing is a type of testing to confirm that a recent program or code change has not adversely affected existing features of the application. Regression testing also relates to full or partial selection of already executed test cases which are re-executed to ensure existing functionalities of the application work fine.

However, as the testing of the application grows more complex, the test cases may become more complex, the test cases may become stagnant and may fail to handle relevant user input and behavior. A plurality of post-production tools are used for capturing user activities in the post production environment. Post production refers to the environment where the final application has been released and the user starts using the application navigating through the different features of the application. Post production tools may be used for monitoring, searching, analyzing and visualizing the machine generated data of the post production environment. Further, the post-production tools are used to track activity of the users such as session duration, pages per session, bounce rate etc. over a website along with the information on the source of the traffic. The activities captured by the post-production tools may include sales activity viewed by a user, viewing of a specific page by the user, or downloading a particular file by the user. The post-production tools also provides more advanced features, including user visitor segmentation. However, in the real world, in the production environment, the user activities may not be exactly same as the regression test cases. While the purpose of regression is to ensure that the production release is seamless, it has been observed it really does not reflect the actual user activities.

It has been further observed that the drawback of the current testing techniques is that a lot of manual effort is involved and also the test cases are based on best guess scenario. This results in a lot of testing effort spent on areas that really does not reflect the importance in production of the application. Moreover, a subject matter expert (SME) identifies the test case manually that leads to reduction in efficiency of the testing process. In addition, the user does not go through the same user activities as defined in the test cases. The user goes through multiple user activities which are not captured during the implementation of the test cases. Therefore, the user activities do not correspond to the regression test cases of the testing environment.

In light of the above drawbacks there is a need for a system and a method for automatically and effectively aligning testing environment with post-production events. There is also a need for reconstructing regression test cases based on actual and real-time events associated with user activities.

SUMMARY OF THE INVENTION

In various embodiment of the present invention a system for reconstructing regression test cases using post production events is provided. The system comprises a memory storing program instructions and a processor executing program instructions stored in the memory. The system comprises a test case reconstruction engine executed by the processor and configured to extract post-production identifiable elements associated with a post-production event and pre-production identifiable elements associated with a pre-production event. The test case reconstruction engine is configured to determine similarity between the pre-production event and the post-production event based on a comparison of one or more pre-production parent identifiable elements and one or more pre-production child identifiable elements of a subject identifiable element, with the post-production identifiable elements. The subject identifiable element is the pre-production identifiable element that does not match with a corresponding post-production identifiable element. The test case reconstruction engine is configured to reconstruct a regression test case based on a comparison of functions of the extracted pre-production identifiable elements and the post-production identifiable elements after the determination of similarity between the pre-production event and the post-production event.

In various embodiments of the present invention, a method for reconstructing regression test cases using post production events executed by a processor comprising program instructions stored in a memory. The method comprises extracting post-production identifiable elements associated with a post-production event and pre-production identifiable elements associated with a pre-production event. The method comprises determining similarity between the pre-production event and the post-production event based on a comparison of one or more pre-production parent identifiable elements and one or more pre-production child identifiable elements of a subject identifiable element, with the post-production identifiable elements. The subject identifiable element is the pre-production identifiable element that does not match with a corresponding post-production identifiable element. The method further comprises reconstructing a regression test case based on a comparison of functions of the extracted pre-production identifiable elements and the post-production identifiable elements after the determination of similarity between the pre-production event and the post-production event.

In various embodiment of the present invention, a computer program product is provided. The computer program product comprises a non-transitory computer readable medium having computer-readable program code stored thereon, the computer readable program code comprising instructions that, when executed by a processor, cause the processor to extract post-production identifiable elements associated with a post-production event and pre-production identifiable elements associated with a pre-production event. A similarity is determined between the pre-production event and the post-production event based on a comparison of one or more pre-production parent identifiable elements and one or more pre-production child identifiable elements of a subject identifiable element, with the post-production identifiable elements. The subject identifiable element is the pre-production identifiable element that does not match with a corresponding post-production identifiable element. A regression test case is reconstructed based on a comparison of functions of the extracted pre-production identifiable elements and the post-production identifiable elements after the determination of similarity between the pre-production event and the post-production event.

DETAILED DESCRIPTION OF THE DRAWINGS

The present invention is described by way of embodiments illustrated in the accompanying drawings wherein.

DETAILED DESCRIPTION OF THE INVENTION

The present invention discloses a system and a method for reconstructing regression test cases using post-production events. Further, the present invention discloses a system and a method for extracting post-production identifiable elements associated with a post-production event and pre-production identifiable elements associated with a pre-production event. The present invention, further, provides for a system and a method for reconstructing a regression test case based on a comparison of functions of the extracted pre-production identifiable elements and the post-production identifiable elements after the determination of similarity between the pre-production event and the post-production event.

The disclosure is provided in order to enable a person having ordinary skill in the art to practice the invention. Exemplary embodiments herein are provided only for illustrative purposes and various modifications will be readily apparent to persons skilled in the art. The general principles defined herein may be applied to other embodiments and applications without departing from the spirit and scope of the invention. The terminology and phraseology used herein is for describing exemplary embodiments and should not be considered limiting. Thus, the present invention is to be accorded the widest scope encompassing numerous alternatives, modifications and equivalents consistent with the principles and features disclosed herein. For purposes of clarity, details relating to technical material that is known in the technical fields related to the invention have been briefly described or omitted so as not to unnecessarily obscure the present invention.

The present invention would now be discussed in context of embodiments as illustrated in the accompanying drawings.

Figure 1:
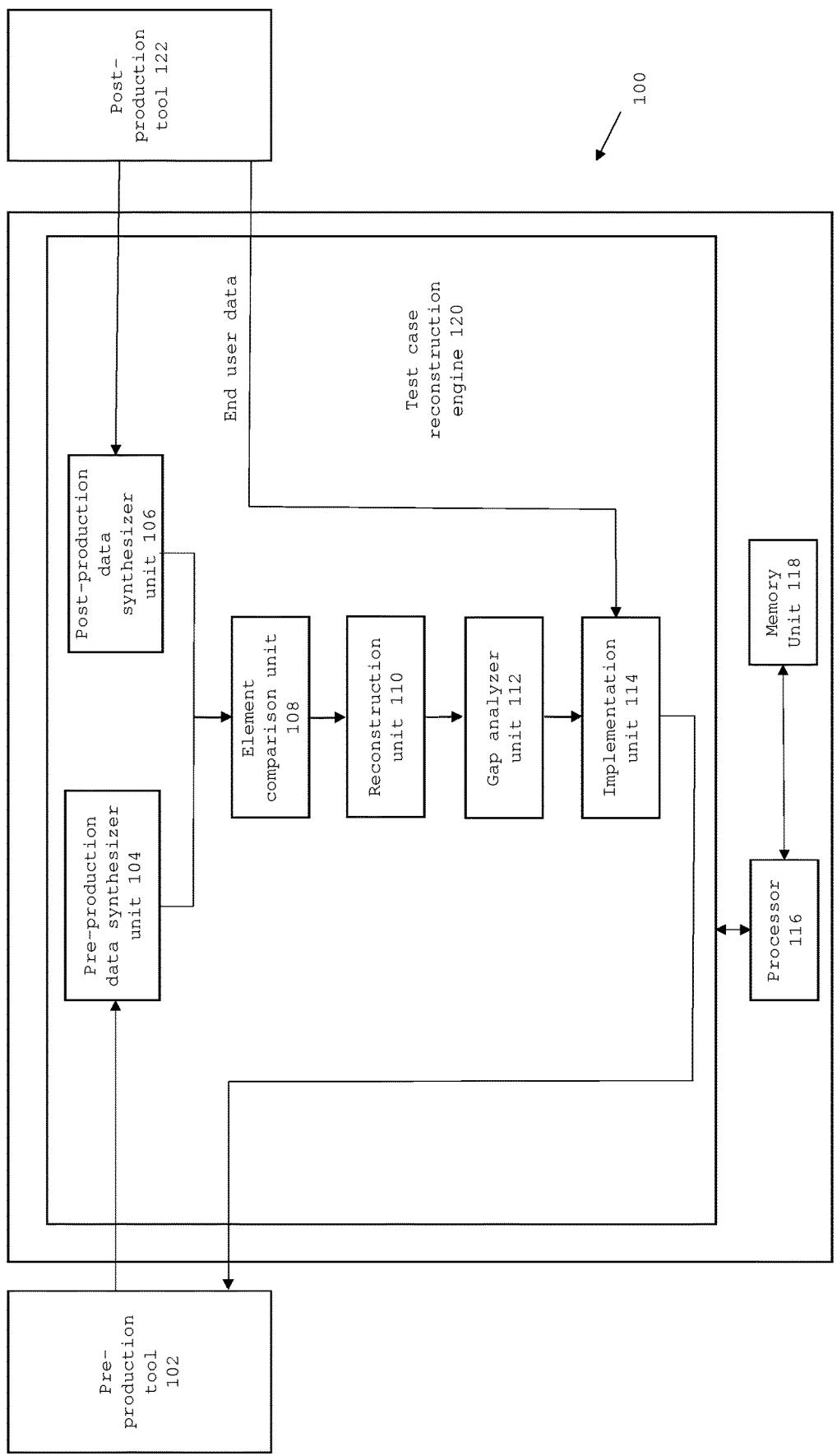
FIG. 1 is a detailed block diagram for reconstructing regression test case scenarios using post-production events, in accordance with an embodiment of the present invention.

FIG. 1 is a detailed block diagram for a system 100 for reconstructing regression test cases using post-production events, in accordance with various embodiments of the present invention. Referring to FIG. 1, in an embodiment of the present invention, the system 100 comprises a pre-production tool 102, a test case reconstruction engine 120 and a post-production tool 122. The test case reconstruction engine 120 further comprises a pre-production data synthesizer unit 104, a post-production data synthesizer unit 106, an element comparison unit 108, a reconstruction unit 110, a gap analyzer unit 112 and an implementation unit 114. In an exemplary embodiment of the present invention, the test case reconstruction engine 120 may be implemented in a cloud computing architecture in which data, applications, services, and other resources are stored and delivered through shared data-centers. The test case reconstruction engine 120 has multiple units that are configured to work in conjunction with each other with respect to the reconstruction of the test cases. The various units of the test case reconstruction engine are operated via the processor 116 specifically programmed to execute instructions stored in the memory 118.

The test case reconstruction engine 120 communicates with the pre-production tool 102 and the post-production tool 122 via a communication channel (not shown). The communication channel (not shown) may include, but is not limited to, a physical transmission medium, such as, a wire, or a logical connection over a multiplexed medium, such as, a radio channel in telecommunications and computer networking. The examples of radio channel in telecommunications and computer networking may include, but are not limited to, a local area network (LAN), a metropolitan area network (MAN) and a wide area network (WAN).

In an embodiment of the present invention, the post-production tool 122 captures one or more post-production events associated with user activities in real-time in a post-production environment. The post-production events captured by the post-production tool 122 include multiple post-production identifiable elements. The post-production identifiable elements represent actionable steps associated with the post-production events. In an exemplary embodiment of the present invention, the post-production identifiable elements may include, but are not limited to, various steps involved in ecommerce activities of a user, viewing of a specific page by the user, downloading of a file by the user etc. in a post-production environment.

The following is an example of post-production identifiable elements extracted from a post-production event:

Home
Login
Clicking on a product page
Looking at product configurations
Looking at similar products
Looking at review comments
Adding to cart
Checkout
Payment In an embodiment of the present invention, each of the post-production identifiable elements include a plurality of functions. Functions represent actionable sub-steps corresponding to each of the post-production identifiable elements. In the above example, one of the functions of the identifiable element 'Payment' may include:

Modes of Payment ( )
  By card; OR
  By e-wallet; OR
  Cash on delivery.

In an embodiment of the present invention, the functions in the post-production environment include a plurality of sub-functions. The sub-functions represent actionable sub-steps corresponding to each of the actionable sub-steps (functions) of the post-production identifiable elements. In the above example, one of the actionable sub-step of the function "mode of payment" is 'By card' which may have the following sub-function.

---

Paying by credit card ( )

{
Going to the payment home page;
Accessing the website of bank;
Asking for username and password;
}

---

In an exemplary embodiment of the present invention, the post-production tool 122 may be a google analytics tool used for capturing the post-production events associated with the user activities in the post-production environment. In another exemplary embodiment of the present invention, the post-production tool 122 may be a dynatrace tool for capturing the post-production events associated with the user activities in the post-production environment. In yet another embodiment of the present invention, the post-production tool 122 may be a splunk tool used for data mining and data extraction for capturing data entered by the user associated with the user activities in the post-production environment. In another exemplary embodiment of the present invention, the post-production data tool 122 may comprise an Application Programming Interface (API) for capturing post-production events and the data entered by user associated with the user activities in the post-production environment. In various embodiments of the present invention, the captured post-production events are stored in the form of logs in the post-production tool 122.

In an embodiment of the present invention, the post-production data synthesizer unit 106 is configured to extract post-production identifiable elements from the events captured by the post-production tool 122 through a log export mechanism. In an exemplary embodiment of the present invention, the log export mechanism comprises downloading logs as a Java Script Object Notation (JSON) or Extensible Markup Language (XML) file from the post-production tool 122. In another exemplary embodiment of the present invention, the log export mechanism may comprise downloading the logs manually. In another exemplary embodiment, the log export mechanism may comprise downloading logs at periodic intervals automatically.

In an embodiment of the present invention, the pre-production tool 102 may include automated regression test cases in a pre-production environment. The automated regression test cases may include multiple test scripts for testing an application. In an embodiment of the present invention, the pre-production data synthesizer unit 104 in the test case reconstruction engine 120 is configured to capture pre-production events corresponding to the automated regression test cases that are executed in the pre-production tool 102. In an exemplary embodiment of the present invention, the pre-production events captured from the regression test cases may include test case name, activity per function of test case, test data and test execution environment information like page visited and actions performed by the pre-defined regression test cases in the pre-production tool 102. In another embodiment of the present invention, the pre-production data synthesizer unit 104 is configured to extract pre-production identifiable elements from the captured pre-production events. The pre-production identifiable elements represent actionable steps associated with the post-production events.

In an example, the pre-production identifiable elements extracted from the pre-production event corresponding to the automated regression test case may include the following:

---

Home
Login
Clicking on a product page
Looking at product configurations
Looking at similar products
Looking at review comments    Subject identifiable element 1
Adding to cart
Checkout
Payment    Subject identifiable element 2

---

In an embodiment of the present invention, the pre-production data synthesizer unit 104 classifies the pre-production identifiable elements as a subject identifiable element, parent identifiable element and child identifiable element. The subject identifiable element is an identifiable element which is identified from amongst all other identifiable elements for processing in accordance with various embodiments of the present invention. The processing of subject identifiable element is explained in later part of the specification. The parent identifiable element includes elements which are preceding to the subject identifiable element. The child identifiable elements include elements succeeding the subject identifiable element. In the above example, the subject identifiable element identified is 'Looking at review comments' and the parent identifiable elements are 'Clicking on a product page', 'Looking at product configurations', 'Looking at similar products', 'Home' and 'Login'. Further, the subject identifiable element 'Looking at a review comments' has child identifiable elements 'Adding to cart', 'Checkout', and 'Payment'.

In an embodiment of the present invention, the pre-production identifiable elements may include a plurality of functions. Functions represent actionable sub-steps corresponding to each of the post-production identifiable elements. In the above example, one of the actionable sub-step of the function "mode of payment" for a subject identifiable element 'payment' is 'paying by credit card'.

---

Modes of payment ( )

{
paying by credit card; OR
paying by debit card; OR
paying by e-wallet; OR
paying by cash on delivery
}

---

In an embodiment of the present invention, the functions in the post-production environment include a plurality of sub-functions. The sub-functions represent actionable sub-steps corresponding to each of the actionable sub-steps (functions) of the post-production identifiable elements. In the above example, one of the actionable sub-step of the function 'mode of payment' i.e. 'paying by credit card' may have the following sub-function.

---
Paying by credit card ( )
---
{
Going to the payment home page;
Accessing the website of bank;
Asking for password;
}
---

In an embodiment of the present invention, the pre-production data synthesizer unit 104 is configured to extract pre-production identifiable elements from the automated regression test cases that is executed in the pre-production tool 102 by a code mutation mechanism. In an exemplary embodiment of the present invention, the code mutation mechanism includes extracting pre-production identifiable elements associated with pre-production events from the automated regression test cases by using artificial intelligence and machine learning.

In an embodiment of the present invention, the element comparison unit 108 in the test case reconstruction engine 120 is configured to identify mismatch between the pre-production identifiable elements and the post-production identifiable elements received from the pre-production data synthesizer unit 104 and post-production data synthesizer unit 106 respectively. In particular, the element comparison unit 108 scans and compares the pre-production identifiable elements and post-production identifiable elements. The element comparison unit 108 then determines if the pre-production events and the post production events are relatable. In an embodiment of the present invention, the relatability is found out by ascertaining a position of the subject identifiable element with respect to its parent and child identifiable elements. After the position of the subject identifiable element is ascertained, the element comparison unit 108 traverses through all the parent and child identifiable elements of the pre-production subject identifiable elements to identify post-production identifiable elements that are similar to the parent and child pre-production identifiable elements. If it is determined that at least one of both of parent identifiable elements and child identifiable elements corresponds to the post-production identifiable elements, then the pre-production event corresponding to the subject identifiable element is identified to be relatable to the post-production event. Once the relatability is identified, the pre-production event is marked as similar to the post-production events. The pre-production events and the post-production events are then transferred to the reconstruction unit 110.

In an embodiment of the present invention, the reconstruction unit 110 in the test case reconstruction engine 120 is configured to compare the similar pre-production and post-production identifiable elements received from the element comparison unit 108 at a functional level. The comparison at the functional level comprises comparing the functions of the pre-production identifiable elements to the functions of the post-production identifiable elements. In the event the function of the pre-production identifiable elements matches with the function of the post-production identifiable elements, the pre-production event corresponding to the function of the pre-production identifiable element is considered as a best fit regression test case. In an embodiment of the present invention, the best fit regression test case is reconstructed as a new regression test case. In the event the functions of the pre-production identifiable elements fail to match with the functions of the post-production identifiable elements, the reconstruction unit 110 is configured to compare the sub-functions of the post-production identifiable elements with the sub-functions of the pre-production identifiable elements. In the event of match of the sub functions, the test case reconstruction engine 120 reconstructs a regression test case by combining various sub-functions of the pre-production identifiable elements that match with the post-production identifiable elements.

In an embodiment of the present invention, the gap analyzer unit 112 in the test case reconstruction engine 120 is configured to remove gaps in the reconstructed regression test case received from the reconstruction unit 110. In an embodiment of the present invention, the gap analyzer unit 112 is configured to provide recommendation of missing pre-production functions in the reconstructed regression test cases in case the reconstructed pre-production event cannot be reconstructed completely by reconstruction unit 110. Based on the recommendations provided by the gap analyzer unit 112, a function may be added to the reconstructed regression test case.

In an embodiment of the present invention, the implementation unit 114 in the test case reconstruction engine 120 is configured to further improve the reconstructed regression test case by using the captured end-user data from the post-production environment captured by a tool such as splunk. In an embodiment of the present invention, the end-user data may relate to search criteria used for an event of accessing an application. In another embodiment of the present invention, the end-user data may relate to the number of entries made by the user while accessing a function of the event. In an exemplary embodiment of the present invention, the end-user data may relate to the final product purchased by a user. In another exemplary embodiment of the present invention, the end-user data may relate to the number of times the user clicked on a certain object in a website. Further the implementation unit 114 is configured to implement the improved regression test cases in the pre-production tool 102 such that the implemented regression test cases directly correspond to the post-production events.

Figure 2:
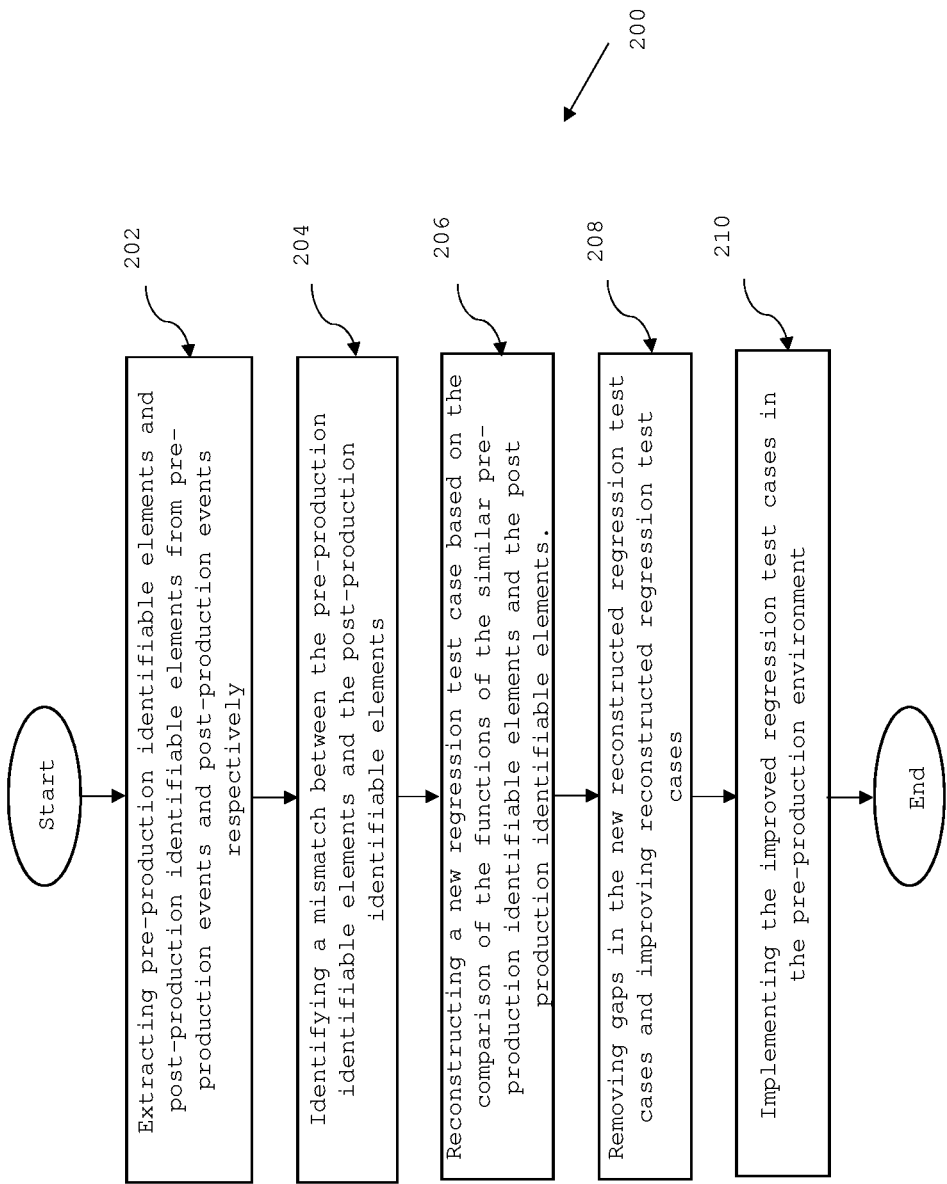
FIG. 2 is a flow chart for reconstructing regression test case scenarios using post-production events, in accordance with an embodiment of the present invention.

FIG. 2 is a flowchart for reconstructing regression test scenarios using post-production events, in accordance with various embodiments of the present invention.

At step 202, pre-production identifiable elements and post production identifiable elements are extracted from pre-production events and post-production events respectively. In an embodiment of the present invention, the post-production identifiable elements represent actionable steps associated with the post-production events. In an exemplary embodiment of the present invention, the post-production identifiable elements may include, but are not limited to, various steps involved in ecommerce activities of a user, viewing of a specific page by the user, downloading of a file by the user etc. in a post-production environment. Each of the post-production identifiable elements include a plurality of functions. Functions represent actionable sub-steps corresponding to each of the post-production identifiable elements. The functions in the post-production environment include a plurality of sub-functions. The sub-functions represent actionable sub-steps corresponding to each of the actionable sub-steps (functions) of the post-production identifiable elements. In an embodiment of the present invention, the post-production identifiable elements are extracted from the captured events through a log export mechanism. In an exemplary embodiment of the present invention, the log export mechanism comprises downloading logs as a Java Script Object Notation (JSON) or Extensible Markup Language (XML) file. In another exemplary embodiment of the present invention, the log export mechanism may comprise downloading the logs manually. In another exemplary embodiment, the log export mechanism may comprise downloading logs at periodic intervals automatically.

In an embodiment of the present invention, the pre-production events captured from the regression test cases may include test case name, activity per function of test case, test data and test execution environment information like page visited and actions performed by the pre-defined regression test cases in the pre-production tool. In another embodiment of the present invention, the pre-production identifiable elements are extracted from the captured pre-production events. The pre-production identifiable elements represent actionable steps associated with the post-production events. In an exemplary embodiment of the present invention, the pre-production identifiable elements are extracted from the automated regression test cases by a code mutation mechanism. In an example embodiment of the present invention, the code mutation mechanism includes extracting pre-production identifiable elements associated with pre-production events from the automated regression test cases by using artificial intelligence and machine learning.

In an embodiment of the present invention, the pre-production identifiable elements are classified as a subject identifiable element, parent identifiable element and child identifiable element. The subject identifiable element is an identifiable element which is identified from amongst all other identifiable elements for processing in accordance with various embodiments of the present invention. The parent identifiable element includes elements which are preceding to the subject identifiable element. The child identifiable elements include elements succeeding the subject identifiable element. In an embodiment of the present invention, the pre-production identifiable elements may include a plurality of functions. Functions represent actionable sub-steps corresponding to each of the post-production identifiable elements. The functions in the post-production environment include a plurality of sub-functions. The sub-functions represent actionable sub-steps corresponding to each of the actionable sub-steps (functions) of the post-production identifiable elements.

At step 204, a mismatch is identified between the pre-production identifiable elements and the post-production identifiable elements. In an embodiment of the present invention, the pre-production identifiable elements are scanned and compared with the post-production identifiable elements. It is then determined if the pre-production events and the post production events are relatable. In an embodiment of the present invention, the relatability is found out by ascertaining a position of the subject identifiable element with respect to its parent and child identifiable elements. After the position of the subject identifiable element is ascertained, the parent and child identifiable elements of the pre-production subject identifiable elements are traversed to identify post-production identifiable elements that are similar to the parent and child pre-production identifiable elements. If it is determined that at least one of both of parent identifiable elements and child identifiable elements corresponds to the post-production identifiable elements, then the pre-production event corresponding to the subject identifiable element is identified to be relatable to the post-production event. Once the relatability is identified, the pre-production event is marked as similar to the post-production events.

At step 206, a regression test case is reconstructed based on the comparison of the functions of the similar pre-production identifiable elements and the post-production identifiable elements. In an embodiment of the present invention, the similar pre-production and post-production identifiable elements are compared at a functional level. The comparison at the functional level comprises comparing the functions of the pre-production identifiable elements with the functions of the post-production identifiable elements. In the event the function of the pre-production identifiable elements matches with the function of the post-production identifiable elements, the pre-production event corresponding to the function of the pre-production identifiable element is considered as a best fit regression test case. In an embodiment of the present invention, the best fit regression test case is reconstructed as a new regression test case. In the event the functions of the pre-production identifiable elements fail to match with the functions of the post-production identifiable elements, the sub-functions of the post-production identifiable elements are compared with the sub-functions of the pre-production identifiable elements. In the event of a match of the sub-functions, a regression test case is reconstructed by combining various sub-functions of the pre-production identifiable elements that match with the post-production identifiable elements.

At step 208, gaps are removed in the reconstructed regression test cases and the reconstructed regression test cases are improved. In an embodiment of the present invention, recommendations are provided of missing pre-production functions in the reconstructed regression test cases in case the reconstructed pre-production event cannot be reconstructed completely. Based on the recommendations, a function may be added to the reconstructed regression test case. The reconstructed regression test case are further improved by using the captured end-user data from the post-production environment captured by a tool such as splunk. In an embodiment of the present invention, the end-user data may relate to search criteria used for an event of accessing an application. In another embodiment of the present invention, the end-user data may relate to the number of entries made by the user while accessing a function of the event. In an exemplary embodiment of the present invention, the end-user data may relate to the final product purchased by a user. In another exemplary embodiment of the present invention, the end-user data may relate to the number of times the user clicked on a certain object in a website.

At step 210, the improved regression test cases are implemented in the pre-production environment. In an embodiment of the present invention, the improved regression test cases are implemented such that the implemented regression test cases directly correspond to the post-production user activities.

Figure 3:
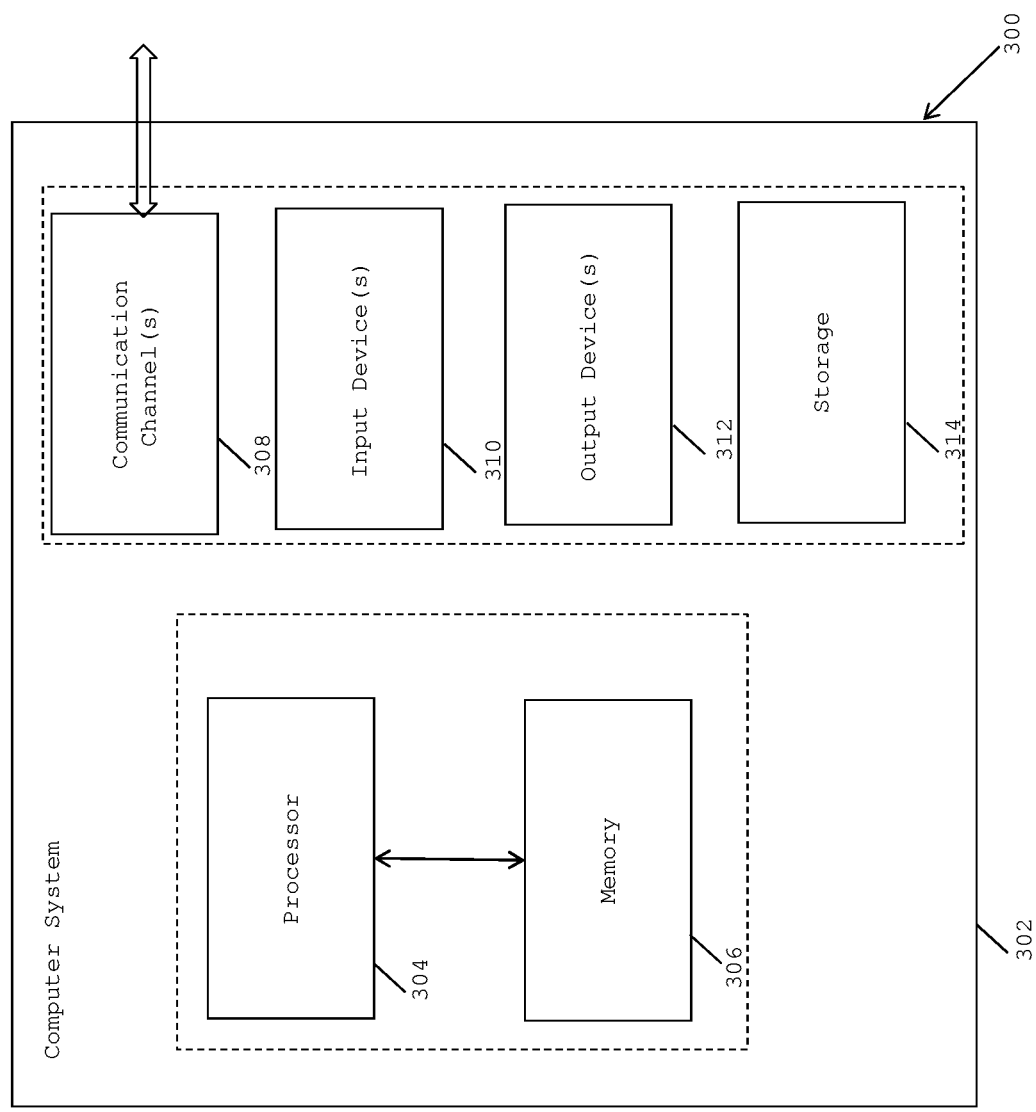
FIG. 3 illustrates an exemplary computer system in which various embodiments of the present invention may be implemented, in accordance with an embodiment of the present invention.

FIG. 3 illustrates an exemplary computer system in which various embodiments of the present invention may be implemented. The computer system 302 comprises a processor 304 and a memory 306. The processor 304 executes program instructions and is a real processor. The computer system 302 is not intended to suggest any limitation as to scope of use or functionality of described embodiments. For example, the computer system 302 may include, but not limited to, a programmed microprocessor, a micro-controller, a peripheral integrated circuit element, and other devices or arrangements of devices that are capable of implementing the steps that constitute the method of the present invention. In an embodiment of the present invention, the memory 306 may store software for implementing an embodiment of the present invention. The computer system 302 may have additional components. For example, the computer system 302 includes one or more communication channels 308, one or more input devices 310, one or more output devices 312, and storage 314. An interconnection mechanism (not shown) such as a bus, controller, or network, interconnects the components of the computer system 302. In an embodiments of the present invention, operating system software (not shown) provides an operating environment for various softwares executing in the computer system 302, and manages different functionalities of the components of the computer system 302.

The communication channel(s) 308 allow communication over a communication medium to various other computing entities. The communication medium provides information such as program instructions, or other data in a communication media. The communication media includes, but not limited to, wired or wireless methodologies implemented with an electrical, optical, RF, infrared, acoustic, microwave, Bluetooth or other transmission media.

The input device(s) 310 may include, but not limited to, a keyboard, mouse, pen, joystick, trackball, a voice device, a scanning device, touch screen or any another device that is capable of providing input to the computer system 302. In an embodiment of the present invention, the input device(s) 310 may be a sound card or similar device that accepts audio input in analog or digital form. The output device(s) 312 may include, but not limited to, a user interface on CRT or LCD, printer, speaker, CD/DVD writer, or any other device that provides output from the computer system 302.

The storage 314 may include, but not limited to, magnetic disks, magnetic tapes, CD-ROMs, CD-RWs, DVDs, flash drives or any other medium which can be used to store information and can be accessed by the computer system 302. In an embodiment of the present invention, the storage 314 contains program instructions for implementing the described embodiments.

The present invention may suitably be embodied as a computer program product for use with the computer system 302. The method described herein is typically implemented as a computer program product, comprising a set of program instructions which is executed by the computer system 302 or any other similar device. The set of program instructions may be a series of computer readable codes stored on a tangible medium, such as a computer readable storage medium (storage 314), for example, diskette, CD-ROM, ROM, flash drives or hard disk, or transmittable to the computer system 302, via a modem or other interface device, over either a tangible medium, including but not limited to optical or analogue communications channel(s) 308. The implementation of the invention as a computer program product may be in an intangible form using wireless techniques, including but not limited to microwave, infrared, Bluetooth or other transmission techniques. These instructions can be preloaded into a system or recorded on a storage medium such as a CD-ROM, or made available for downloading over a network such as the internet or a mobile telephone network. The series of computer readable instructions may embody all or part of the functionality previously described herein.

The present invention may be implemented in numerous ways including as a system, a method, or a computer program product such as a computer readable storage medium or a computer network wherein programming instructions are communicated from a remote location.

While the exemplary embodiments of the present invention are described and illustrated herein, it will be appreciated that they are merely illustrative. It will be understood by those skilled in the art that various modifications in form and detail may be made therein without departing from or offending the spirit and scope of the invention.

We claim:

1. A system for reconstructing regression test cases using post production events for application testing, wherein the system comprises:
    a memory storing program instructions;
    a processor in communication with the memory to execute
    a test case reconstruction engine to:
        extract post-production identifiable elements associated with a post-production event that corresponds to activities after an application is released in a post-production environment, and pre-production identifiable elements associated with a pre-production event corresponding to automated regression test cases;
        determine similarity between the pre-production event and the post-production event based on a comparison of one or more pre-production parent identifiable elements and one or more pre-production child identifiable elements of a subject identifiable element, with the post-production identifiable elements, wherein the subject identifiable element is the pre-production identifiable element that does not match with a corresponding post-production identifiable element; and
        reconstruct a regression test case based on a comparison of functions of the extracted pre-production identifiable elements and the post-production identifiable elements after the determination of similarity between the pre-production event and the post-production event,
        wherein the test case reconstruction engine determines the similarity by identifying the pre-production event as an event similar to the post-production event based on a determination that at least one of both of the pre-production parent identifiable elements and the child identifiable elements of the pre-production subject identifiable element correspond to the post-production identifiable elements.

2. The system as claimed in claim 1, wherein the test case reconstruction engine is configured to reconstruct the regression test case based on a determination of a match of the functions of the extracted pre-production identifiable elements and the functions of the pre-production identifiable elements, wherein the functions represent actionable sub-steps corresponding to each of the post-production identifiable elements.

3. The system as claimed in claim 1, wherein the test case reconstruction engine is configured to reconstruct the regression test case by:
    comparison of sub-functions of the pre-production identifiable elements with sub-functions of the post-production identifiable elements based on a determination of a mismatch of the functions of the extracted pre-production identifiable elements and the functions of the pre-production identifiable elements; and
    combining the sub-functions of the pre-production identifiable elements that match with the post-production identifiable elements, wherein the sub-functions represent actionable sub-steps corresponding to each of the actionable sub-steps of the post-production identifiable elements.

4. The system as claimed in claim 1, wherein the test case reconstruction engine comprises a gap analyzer unit configured to remove gaps in the reconstructed regression test case based on a recommendation of missing functions associated with the pre-production identifiable elements.

5. The system as claimed in claim 1, wherein the test case reconstruction engine comprises an implementation unit configured to improve the reconstructed regression test cases based on end-user data and implement the improved regression test cases in the pre-production environment.

6. The system as claimed in claim 1, wherein the test case reconstruction engine comprises a pre-production data synthesizer unit configured to capture the pre-production event from a pre-production tool and extract the pre-production identifiable elements based on a code mutation mechanism.

7. The system as claimed in claim 1, wherein the test case reconstruction engine comprises a post-production data synthesizer unit configured to extract the post-production identifiable elements from the post-production event through a log export mechanism.

8. The system as claimed in claim 1, wherein the parent identifiable element may include elements which are preceding to the subject identifiable elements.

9. The system as claimed in claim 1, wherein the child identifiable elements include elements which are succeeding to the subject identifiable element.

10. A method for reconstructing regression test cases using post production events for application testing executed by a processor in communication with a memory, the method comprising:
  extracting post-production identifiable elements associated with a post-production event that corresponds to activities after an application is released in a post-production environment, and pre-production identifiable elements associated with a pre-production event corresponding to automated regression test cases;
  determining similarity between the pre-production event and the post-production event based on a comparison of one or more pre-production parent identifiable elements and one or more pre-production child identifiable elements of a subject identifiable element, with the post-production identifiable elements, wherein the subject identifiable element is the pre-production identifiable element that does not match with a corresponding post-production identifiable element; and
  reconstructing a regression test case based on a comparison of functions of the extracted pre-production identifiable elements and the post-production identifiable elements after the determination of similarity between the pre-production event and the post-production event, wherein the step of determining the similarity comprises identifying the pre-production event as an event similar to the post-production event based on a determination that at least one of both of the pre-production parent identifiable elements and the child identifiable elements of the pre-production subject identifiable element correspond to the post-production identifiable elements.

11. The method as claimed in claim 10, wherein the step of reconstructing comprises reconstructing the regression test case based on a determination of a match of the functions of the extracted pre-production identifiable elements and the functions of the pre-production identifiable elements, wherein the functions represent actionable sub-steps corresponding to each of the post-production identifiable elements.

12. The method as claimed in claim 10, wherein the step of reconstructing comprises reconstructing the regression test case by:
  comparing sub-functions of the pre-production identifiable elements with sub-functions of the post-production identifiable elements based on a determination of a mismatch of the functions of the extracted pre-production identifiable elements and the functions of the pre-production identifiable elements; and
  combining the sub-functions of the pre-production identifiable elements that match with the post-production identifiable elements, wherein the sub-functions represent actionable sub-steps corresponding to each of the actionable sub-steps of the post-production identifiable elements.

13. The method as claimed in claim 10, further comprising removing gaps in the reconstructed regression test case based on a recommendation of missing functions associated with the pre-production identifiable elements.

14. The method as claimed in claim 10, further comprising improving the reconstructed regression test cases based on end-user data and implementing the improved regression test cases in the pre-production environment.

15. The method as claimed in claim 10, wherein the step of extracting comprises extracting the pre-production identifiable elements based on a code mutation mechanism.

16. The method as claimed in claim 10, wherein the step of extracting comprises extracting the post-production identifiable elements from the post-production event through a log export mechanism.

17. The method as claimed in claim 10, wherein the parent identifiable element may include elements which are preceding to the subject identifiable elements and the child identifiable elements include elements which are succeeding to the subject identifiable element.

18. A computer program product comprising:
  a non-transitory computer readable medium having computer-readable program code stored thereon, the computer readable program code comprising instructions that, when executed by a processor, cause the processor to:
  extract post-production identifiable elements associated with a post-production event that corresponds to activities after an application is released in a post-production environment, and pre-production identifiable elements associated with a pre-production event corresponding to automated regression test cases;
  determine similarity between the pre-production event and the post-production event based on a comparison of one or more pre-production parent identifiable elements and one or more pre-production child identifiable elements of a subject identifiable element, with the post-production identifiable elements, wherein the subject identifiable element is the pre-production identifiable element that does not match with a corresponding post-production identifiable element; and
  reconstruct a regression test case based on a comparison of functions of the extracted pre-production identifiable elements and the post-production identifiable elements after the determination of similarity between the pre-production event and the post-production event, wherein the similarity between the pre-production event and the post-production event is carried out by identifying the pre-production event as an event similar to the post-production event based on a determination that at least one of both of the pre-production parent identifiable elements and the child identifiable elements of the pre-production subject identifiable element correspond to the post-production identifiable elements.

* * * * *